United States Patent
Chen

(10) Patent No.: US 10,921,937 B2
(45) Date of Patent: Feb. 16, 2021

(54) TOUCH PANEL AND METHOD FOR MAKING SAME

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Chun-Ming Chen, Hsinchu (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 114 days.

(21) Appl. No.: 16/195,138

(22) Filed: Nov. 19, 2018

(65) Prior Publication Data
US 2020/0026374 A1 Jan. 23, 2020

(30) Foreign Application Priority Data
Jul. 19, 2018 (CN) .......................... 201810794917.1

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .................................. G06F 3/041; G06F 3/044
See application file for complete search history.

(56) References Cited

U.S. PATENT DOCUMENTS

| | | | | |
|---|---|---|---|---|
| 5,614,728 A | * | 3/1997 | Akiyama | H01L 27/12 257/347 |
| 2011/0254804 A1 | * | 10/2011 | Kuo | G06F 3/0418 345/174 |
| 2014/0198266 A1 | * | 7/2014 | Park | H05K 1/097 349/12 |
| 2017/0031486 A1 | * | 2/2017 | Li | H05K 3/4644 |
| 2017/0308212 A1 | * | 10/2017 | Jin | G06F 3/0416 |
| 2018/0120977 A1 | * | 5/2018 | Shim | G06F 3/044 |

* cited by examiner

*Primary Examiner* — Chanh D Nguyen
*Assistant Examiner* — Nguyen H Truong
(74) *Attorney, Agent, or Firm* — ScienBiziP, P.C.

(57) ABSTRACT

A touch panel includes a substrate, a plurality of first electrodes, a plurality of first bridge portions, and a plurality of second electrodes on the substrate. A plurality of connecting pads is on a side of the second electrodes away from the substrate. The connecting pads are made of a non-transparent conductive material. An insulating layer is on the substrate and covers the first electrodes, the first bridge portions, and the second electrodes. The insulating layer defines a plurality of through holes. Each connecting pad is exposed from the insulating layer by one through hole. A plurality of second bridge portions is on a side of the insulating layer away from the substrate. Each of the second bridge portions extends into adjacent two through holes to electrically couple adjacent two second electrodes.

13 Claims, 7 Drawing Sheets

TOUCH PANEL AND METHOD FOR MAKING SAME

FIELD

The subject matter herein generally relates to a touch panel and a method for making the touch panel.

BACKGROUND

A conventional capacitive touch panel generally includes a substrate, and strings of first electrodes and strings of second electrodes on the substrate. Each string of first electrodes is perpendicular to the strings of second electrodes. Each string of first electrodes includes first electrodes; every two adjacent first electrodes in a same string are electrically coupled by a first bridge portion. Each string of second electrodes includes second electrodes; every two adjacent second electrodes in a same string are electrically coupled by a second bridge portion. The second bridge portion spans and is perpendicular to the first bridge portion, and an insulating layer is located between the first bridge portion and the second bridge portion. The insulating layer defines through holes. The second bridge portion is formed on the insulating layer and extends into two through holes to be electrically coupled to adjacent second electrodes.

The substrate is vulnerable to thermal expansion and or an operation error generated during manufacturing of the touch panel, and the relative position of the through hole in the insulating layer and the substrate often shifts, resulting in misalignment of the second bridge portion to the through holes. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
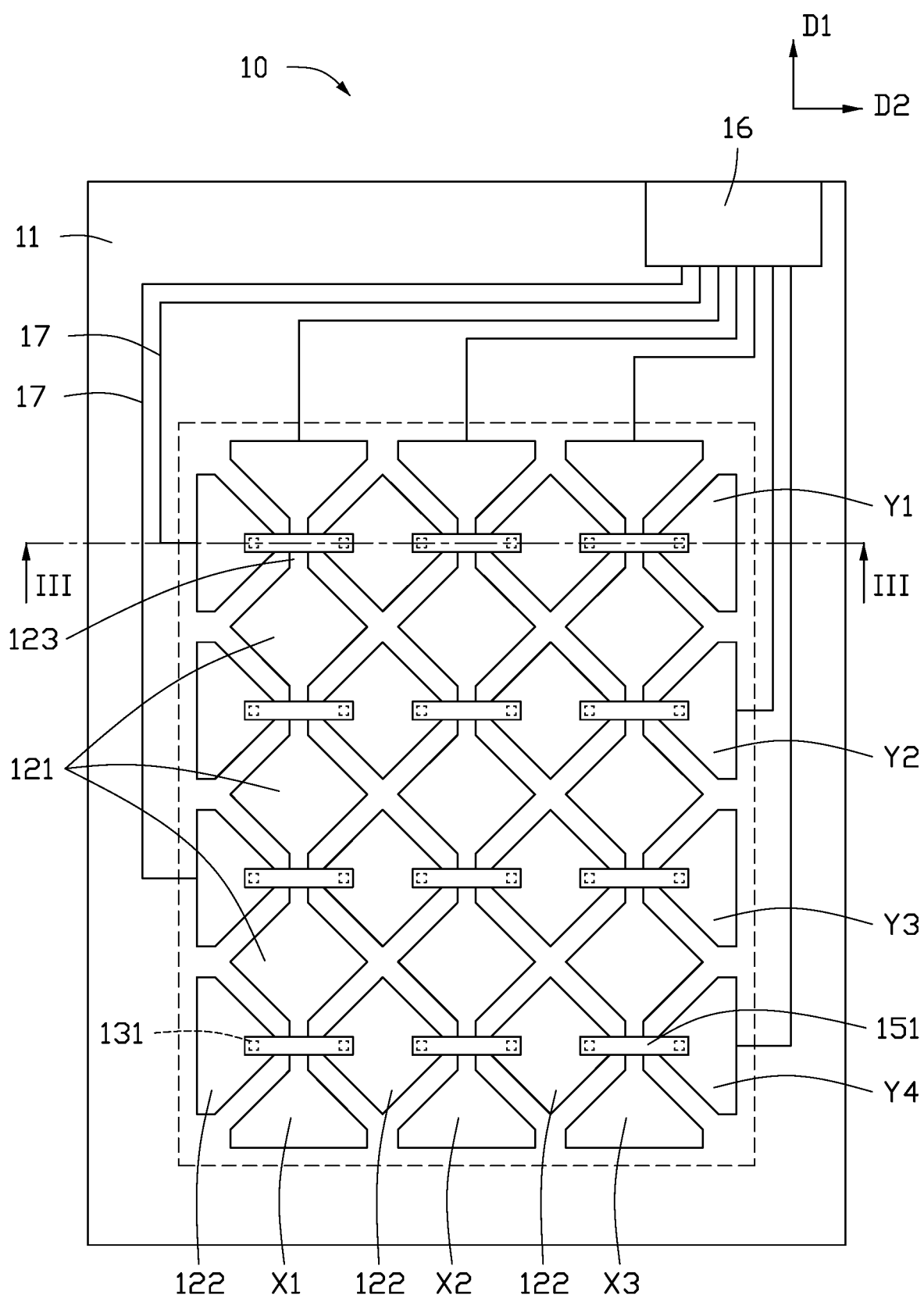
FIG. 1 is a plan view of a touch panel according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Figure 2:
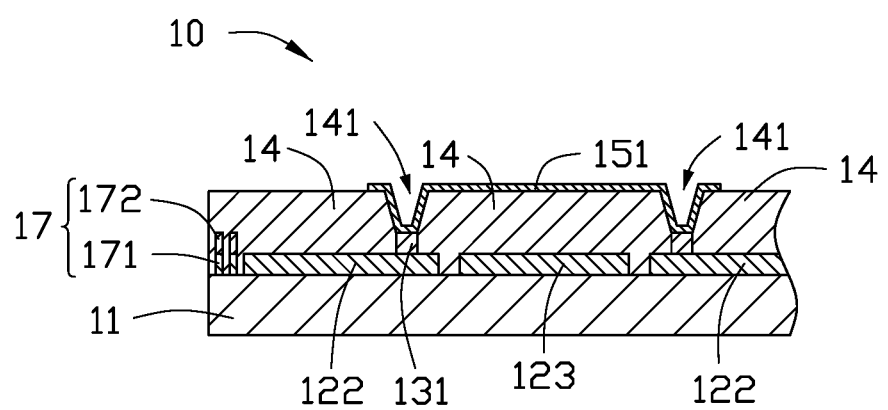
FIG. 2 is a cross-sectional view of the touch panel of FIG. 1 taken along line III-III.

FIG. 1 and FIG. 2 illustrate a touch panel 10 according to a first embodiment of the present disclosure. As shown in FIG. 1, the touch panel 10 includes a substrate 11, and a plurality of first electrodes 121, a plurality of second electrodes 122, and a plurality of first bridge portions 123 which are disposed on the substrate 11. In one embodiment, the touch panel 10 can be a capacitive touch panel. The first electrodes 121 are arranged in columns in a first direction (direction D1 in FIG. 1), and each of the first bridge portions 123 is electrically coupled between adjacent two first electrodes 121 in a column to form a first electrode string X. The touch panel 10 in FIG. 1 shows the first electrode strings X1, X2, and X3. In other embodiments, the touch panel 10 can include more than three first electrode strings X.

As shown in FIG. 1 and FIG. 2, the touch panel 10 further includes a plurality of connecting pads 131. Each of the connecting pads 131 is disposed on one of the second electrodes 122 and contacts therewith. The second electrodes 122 are arranged in rows in a second direction (direction D2 in FIG. 1). Each of the second electrodes 122 is spaced apart from the first electrodes 121 and the first bridge portions 123.

The touch panel 10 further includes a plurality of second bridge portions 151. Each of the second bridge portions 151 is coupled between two adjacent connecting pads 131. The second electrodes 122 in a row in the second direction D2 are electrically coupled to to form a second electrode string Y. The touch panel 10 in FIG. 1 shows the second electrode strings Y1, Y2, Y3, and Y4. In one embodiment, the touch panel 10 can include more than four second electrode strings Y.

The touch panel 10 further includes a driving circuit 16 and a plurality of traces 17. The traces 17 include traces for electrical connection between the first electrode strings X and the driving circuit 16, and traces for electrical connection between the second electrode strings Y and the driving circuit 16.

Referring to FIG. 2, each of the plurality of traces 17 includes a first sub-line 171 and a second sub-line 172 stacked on the first sub-line 171. The first sub-line 171 is formed on the substrate 11, and the second sub-line 172 is formed on a side of the first sub-line 171 away from the substrate 11.

Referring to FIG. 2, the touch panel 10 further includes an insulating layer 14 disposed on the substrate 11. The insulating layer 14 is configured to cover the first electrodes 121, the second electrodes 122, and the first bridge portions 123. A plurality of through holes 141 are defined in the insulating layer 14. FIG. 2 shows two through holes. Each through hole 141 corresponds to and overlaps one connecting pad 131, so the connecting pad 131 is exposed from the insulating layer 14. Each of the second bridge portions 151 is formed on the insulating layer 14 and electrically coupled between two adjacent connecting pads 131 by the through holes 141, thus adjacent two second electrodes 122 in a second electrode string Y are electrically connected to each other.

In one embodiment, the first electrodes 121 can function as touch driving electrodes (Tx); and the second electrodes 122 can function as touch sensing electrodes (Rx). In the present embodiment, the first electrodes 121 function as the touch sensing electrode (Rx), and the second electrodes 122 function as the touch driving electrode (Tx). The traces 17 are divided into two groups, the number of traces 17 of the two groups are not necessarily the same. In one embodiment, the number of the traces 17 in each of the groups is determined according to the number of the first electrode strings X and the number of the second electrode strings Y. Each trace 17 in one group is correspondingly electrically coupled between one second electrode string Y and the driving circuit 16, respectively, such that the second electrodes 122 can receive driving signal from the driving circuit 16. Each trace 17 in other group is correspondingly electrically coupled between one first electrode string X and the driving circuit 16, respectively, such that sensing signals of the first electrodes 121 (Rx) can be transmitted to the driving circuit 16. Thus, the touch operations can be analyzed by the touch panel according to sensing signals, and the display device including the touch panel can perform corresponding operations according to the touch operation.

In the present embodiment, the first electrode string X and the second electrode string Y are perpendicular to each other. In other embodiments, the first electrode string X and the second electrode string Y may intersect at other angles.

In this embodiment, the first electrodes 121, the second electrodes 122, the first bridge portions 123, and the second bridge portions 151 are made of transparent conductive materials, such as indium tin oxide (ITO), AgNW, PEDOT, etc. The connecting pad 131 may be made of a non-transparent conductive material, such as Cu, Ag, or the like, or an alloy. In one embodiment, the first electrodes 121, the second electrodes 122, the first bridge portions 123, and the first sub-lines 171 may be formed by patterning a single conductive material layer. The connecting pads 131 and the second sub-lines 172 may be formed by patterning one single conductive material layer.

The insulating layer 14 is made of a negative-type photoresist material. In one embodiment, the negative-type photoresist material may be polyisoprene rubber. The insulating layer 14 can cooperate with the non-transparent connecting pads 131 to form the through holes 141. Light from a side of substrate 11 away from the first electrodes 121 perpendicularly irradiates the substrate 11. The substrate 11, the first electrodes 121, the second electrodes 122, and the first bridge portions 123 are transparent, and the connecting pads 131 are non-transparent. Therefore, a portion of the insulating layer 14 overlapping the connecting pads 131 is not irradiated by light. Depending on characteristics of the negative-type photoresist, a portion of the insulating layer 14 that is not exposed can be dissolved in a developing solution. The portion of the insulating layer 14 overlapping the connecting pads 131 is dissolved in the developing solution, and each through hole 141 corresponding to one connecting pad 131 is defined in the insulating layer 14.

Since the first electrodes 121, the second electrodes 122, and the connecting pads 131 are disposed on one substrate 11, when the substrate 11 is deformed during the processes, the relative positions between the connecting pads 131 and the second electrodes 122 does not cause position deviation. Correct positioning of the through holes 141 disposed on the insulating layer 14 may be achieved. The second bridge portion 151 is configured to establish electrical connection between two adjacent second electrodes 122 of the second electrode string Y by the connecting pad 131. The insulating layer 14 is disposed between the first bridging portion 123 and the second bridging portion 151 to insulate therebetween.

In the present embodiment, the connecting pad 131 may be various shapes. In one embodiment, one or more through openings (not shown) may be formed in the connecting pad 131 to increase the transmittance of the touch panel 10. The shape of the through opening is not limited therein.

Figure 3:
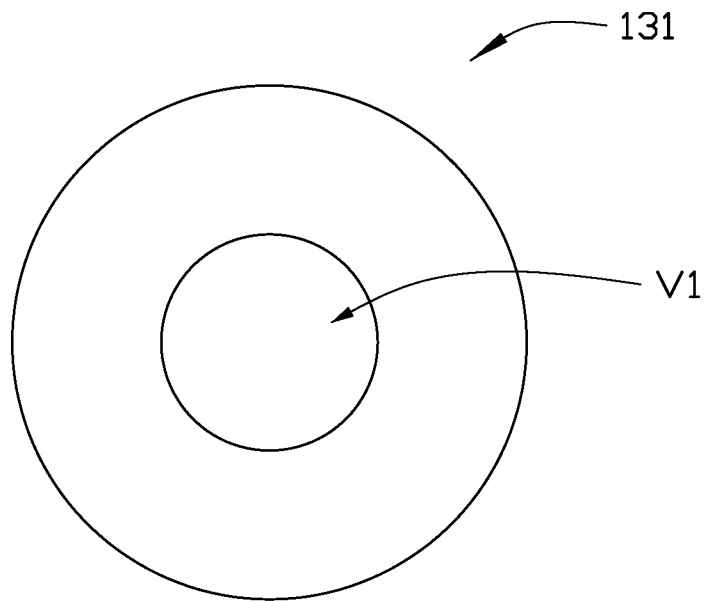
FIG. 3 is a plan view of a connecting pad according to a first embodiment of the present disclosure.
Figure 4:
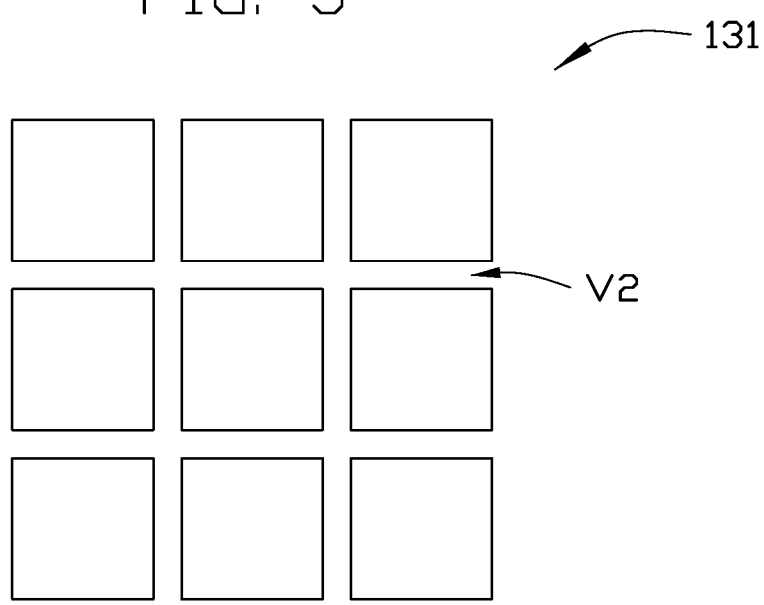
FIG. 4 is a plan view of a connecting pad according to a second embodiment of the present disclosure.

In one embodiment, as shown in FIG. 3, the connecting pad 131 has a circular cross section and defines a circular opening V1. A diameter of the circular opening V1 is controlled to be less or equal to 10 µm. In one embodiment, as shown in FIG. 4, the connecting pad 131 has a rectangular cross section and defines strip-shaped openings V2 of one width, and such width is controlled to be less or equal to 10 µm. The range of diameters of the circular opening V1 and the width of the opening V2 are determined by considering both transparency and stability of the connecting pad 131, so the touch panel 10 can improve the transmittance and ensure an electrical coupling between the second bridge portion 151 and the connecting pad 131.

The through holes 141 may be positioned with accuracy in the insulating layer 14 of the touch panel 10 by cooperation of the opaque connecting pad 131 and the insulating layer 14 of the negative photoresist. Thus every two second electrodes 122 in a same second electrode string Y can be electrically coupled together. The coupling yield between the second bridge portions 151 and the second electrodes 122 may be improved, and the offset positioning between the bridge portions and the electrodes may be avoided.

Figure 5:
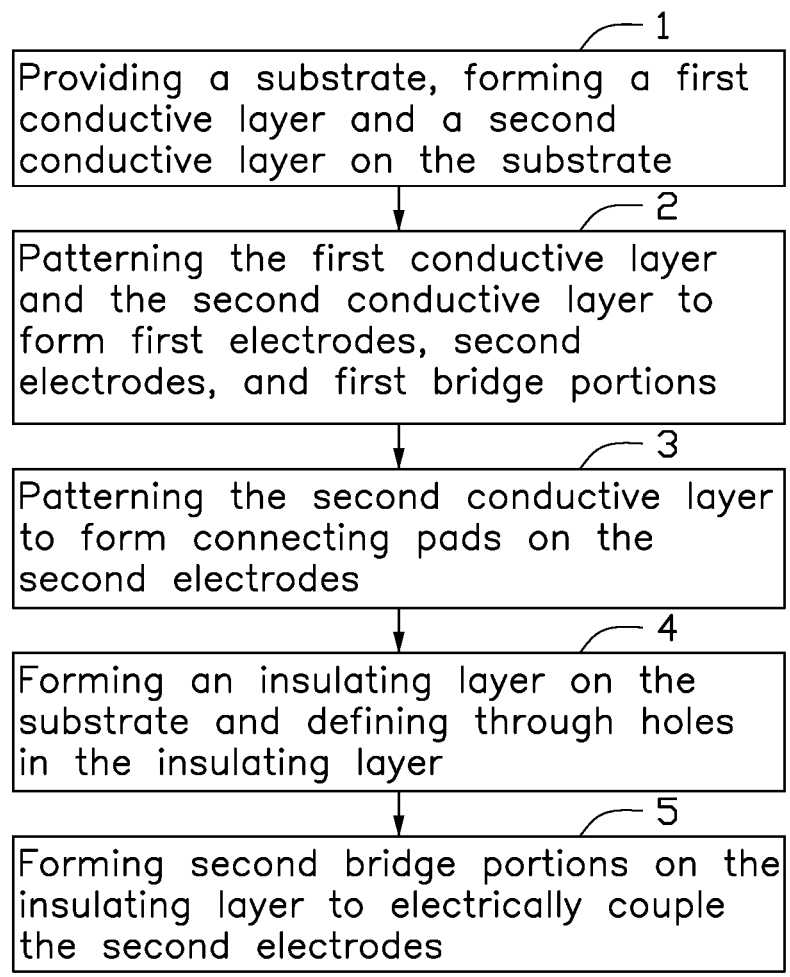
FIG. 5 is a flowchart of a method for making a touch panel according to an embodiment of the present disclosure.

A method for making the touch panel 10 includes the following blocks, as shown in FIG. 5.

In block S1: a substrate is provided, a first conductive layer is formed on a surface of the substrate, and a second conductive layer is formed on the first conductive layer.

In block S2: the first conductive layer and the second conductive layer are patterned for a first time to form a plurality of first electrodes, a plurality of second electrodes, and a plurality of first bridge portions each electrically coupling between adjacent two first electrodes.

In block S3: the second conductive layer after first patterning is patterned for a second time to remove all of the first electrodes, all of the first bridge portions, and a portion of each of the second electrodes in the second conductive layer, and the retained portion of the second electrodes forms a plurality of connection pads.

In block S4: an insulating layer is formed on the substrate, and a plurality of through holes are formed in the insulating layer. The insulating layer covers the first conductive layer after patterning. Each of the through holes is formed at a position corresponding to each of the connecting pads, respectively.

At block S5: a plurality of second bridge portions are formed on the insulating layer. Each of the plurality of second bridge portions is used to electrically couple between two adjacent second electrodes via the through holes.

Figure 6:
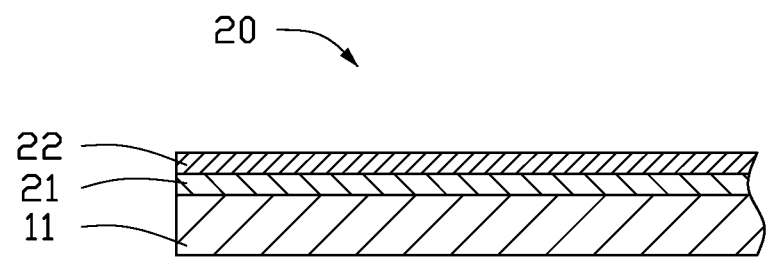
FIG. 6 through FIG. 11 are cross-sectional views showing a touch panel at each block of a method for making the touch panel.

As shown in FIG. 6, a laminate 20 is provided. The laminate 20 includes the substrate 11, and the first conductive layer 21 and the second conductive layer 22 formed on the substrate 11. The substrate 11 is transparent and can be made of a transparent glass or plastic. In one embodiment, the first conductive layer 21 is made of a transparent conductive material, such as ITO, AgNW, PEDOT, etc. The second conductive layer is made of a non-transparent conductive material, such as Cu, Ag, an alloy.

Figure 7:
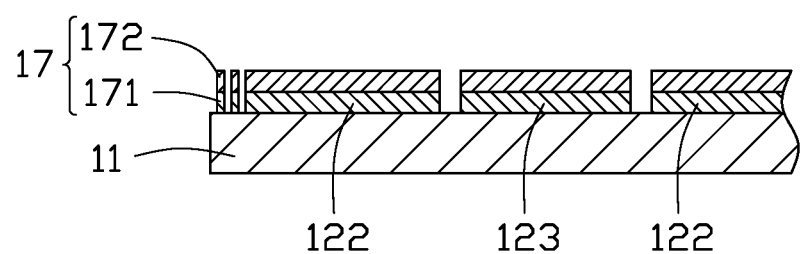

As shown in FIG. 7, in the block S2, the first conductive layer 21 and the second conductive layer 22 are first patterned. After the first patterning process, the first conductive layer 21 includes a plurality of first electrodes 121, a plurality of second electrodes 122, and a plurality of first bridge portions 123. As shown in FIG. 1, the first electrodes 121 are arranged in columns in the first direction (direction D1 in FIG. 1), and each first bridge portion 123 is electrically coupled between two adjacent first electrodes 121 in a same column to form a first electrode string X. The second electrodes 122 are arranged in row in the second direction (direction D2 in FIG. 1), in which they are apart by a first electrode string X in row.

After the first patterning process, the second conductive layer 22 forms a same pattern as the first conductive layer 21. That is the second conductive layer 22 after the first patterning also includes a plurality of first electrodes 121, a plurality second electrodes 122, and a plurality of first bridge portions 123.

For block S2, a plurality of traces 17 are formed by first patterning the first conductive layer 21 and the second conductive layer 22. Each of the traces 17 includes a first sub-line 171 formed by the first conductive layer 21 and a second sub-line 172 formed by the second conductive layer 22.

Figure 8:
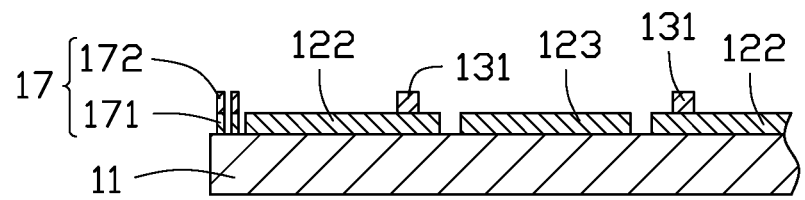

For block S3, referring to FIG. 8, the second conductive layer 22 after the first patterning is subjected to a second patterning. During the manufacturing in the block S3, all of the first electrodes, all of the first bridge portions, and a partial portion of each of the second electrodes in the second conductive layer 22 after the first patterning are removed by the second patterning, and the remained portion of the second conductive layer 22 forms a plurality of connection pads 131. The second conductive layer 22 after the second patterning forms the connecting pads 131. The connecting pads 131 is in direct contact with the second electrodes 122.

Figure 9:
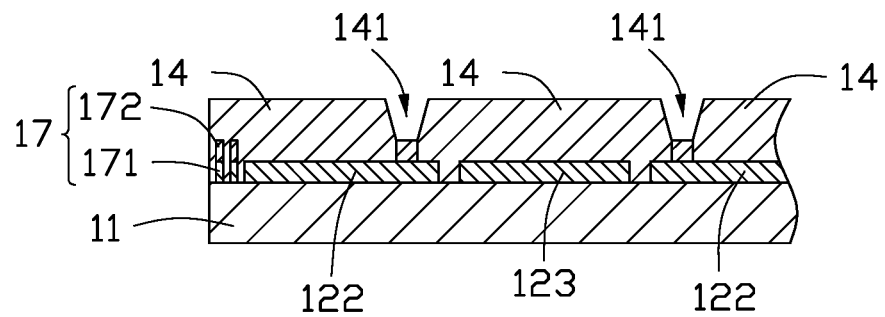

For block S4, referring to FIG. 9, in order to insulate the first bridge portion 123 from the second bridge portion 151, the insulating layer 14 is formed on the first electrodes 121 and the second electrodes 122. The through holes 141 are defined in the insulating layer 14. The insulating layer 14 is made of a negative-type photoresist material. Depending on characteristics of the negative-type photoresist, such as polyisoprene rubber, a portion of the negative-type photoresist that is exposed by light will not dissolve in a developing solution; a portion of the negative-type photoresist that is not exposed by the light will dissolve in the developing solution. Light from a side of substrate 11 away from the first electrodes 121 is perpendicularly irradiated to the substrate 11. Some portions of the insulating layer 14 are shielded by the nontransparent connecting pads 131 and not irradiated by light, then dissolves in the developing solution. Thus, the through holes 141 are defined in the insulating layer 14.

Figure 10:
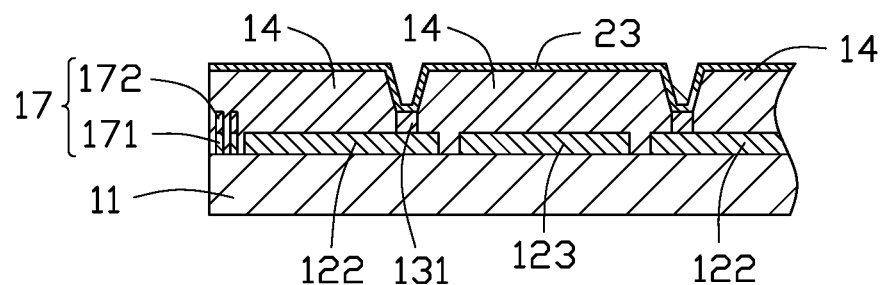

For block S5, referring to FIG. 10, second bridge portions 151 are formed on the insulating layer 14 and made of transparent conductive material, such as ITO, AgNW, PEDOT, etc. Each second bridge portion 151 is formed above two adjacent through holes 141; and two ends of the second bridge portion 151 are electrically coupled to the connecting pads 131 corresponding to two through holes 141, as such two adjacent second electrodes 122 in a row are electrically connected.

Figure 11:
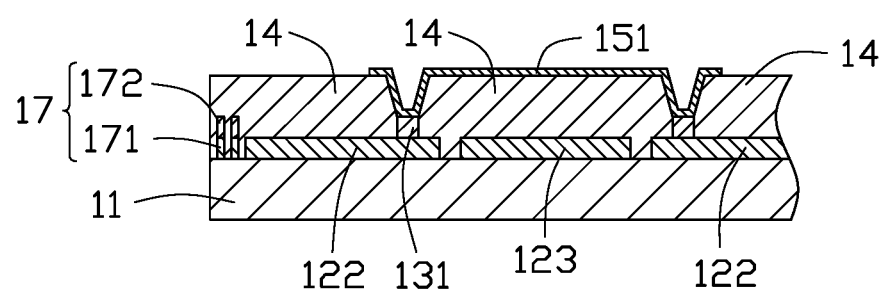

As shown in FIG. 10, a third conductive layer 23 completely covering the insulating layer 14 is formed on the insulating layer 14, and then patterned for a third time. As shown in FIG. 11, the third conductive layer 23 is patterned to form a plurality of second bridge portions 151.

The making method of the touch panel 100 in the present disclosure realizes the through holes 141 in the insulating layer 14 are positioned with accuracy by utilizing cooperation of the opaque connecting pads 131 and negative type photoresist of the insulating layer 14, as such each second bridge portion can electrically connect two adjacent second electrodes 122 in a same second electrode string Y. The manufacturing method of the touch panel 100 improves connection yield between the second bridge portions 151 and the second electrodes 122. Offset between the bridge portions and the electrodes may be solved.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A touch panel comprising:
a substrate;
a plurality of first electrodes, a plurality of first bridge portions, and a plurality of second electrodes on the substrate; the plurality of first electrodes being arranged in columns in a first direction; each of the plurality of first bridge portions being configured to electrically couple between adjacent two of the first electrodes in one column; the plurality of second electrodes being arranged in rows in a second direct, wherein the first direction intersects with the second direction;
a plurality of connecting pads made of a non-transparent conductive material, disposed on a side of the plurality of second electrodes away from the substrate, each of the plurality of connecting pads contacting each of the plurality of second electrodes correspondingly;
an insulating layer on the substrate, configured to cover the plurality of first electrodes, the plurality of first bridge portions, and the plurality of second electrodes, the insulating layer comprising a plurality of through holes exposing each of the plurality of connecting pads; and
a plurality of second bridge portions on a side of the insulating layer away from the substrate, each of the plurality of second bridge portions being configured to electrically connect between adjacent two of the second electrodes in one row;
wherein each of the plurality of connecting pads is between one of the plurality of second bridge portions and one of the plurality of second electrodes; each of the plurality of connecting pads defines a plurality of through opening; each of the plurality of through openings is strip-shaped; the plurality of through openings intersect to be a mesh shape.

2. The touch panel of claim 1, wherein the first electrodes in each of the columns are electrically coupled individually by the plurality of first bridge portions to form a first electrode string; the second electrodes in each of the rows are electrically coupled individually by the plurality of second bridge portions to form a second electrode string.

3. The touch panel of claim 2, further comprising a plurality of traces and a driving circuit on the substrate; wherein each of the plurality of traces is electrically coupled between the driving circuit and the first electrode string or between the driving circuit and the second electrode string.

4. The touch panel of claim 3, wherein each of the plurality of traces comprises a first sub-line on the substrate and a second sub-line on a side of the first sub-line away from the substrate.

5. The touch panel of claim 1, wherein each of the plurality of through openings has a width less or equal to 10 μm.

6. The touch panel of claim 1, wherein the insulating layer is made of a negative-type photoresist material.

7. The touch panel of claim 1, wherein the substrate, the plurality of first electrodes, the plurality of second electrodes, and the plurality of first bridge portions are transparent.

8. A method for making a touch panel comprising:
providing a substrate, forming a first conductive layer on the substrate, and forming a second conductive layer on the first conductive layer;
first patterning the first conductive layer and the second conductive layer to form a plurality of first electrodes, a plurality of second electrodes, and a plurality of first bridge portions configured to electronically connect adjacent two of the first electrodes;
second patterning the second conductive layer to form a plurality of connecting pads on the plurality of second electrodes, wherein each of the plurality of connecting pads defines a plurality of through opening; each of the plurality of through openings is strip-shaped; the plurality of through openings intersect to be a mesh shape;
forming an insulating layer on the substrate to cover the plurality of first electrodes, the plurality of second electrodes, and the plurality of first bridge portions;
defining a plurality of through holes in the insulating layer, each of the plurality of connecting pads being exposed from the insulating layer by one of the plurality of through holes;
forming a plurality of second bridge portions on the insulating layer, each of the plurality of second bridge portions extends into adjacent two of the plurality of through holes to electrically couple to adjacent two of the plurality of second electrodes.

9. The method of claim 8, further comprising forming a plurality of traces by first patterning the first conductive layer and the second conductive layer; each of the plurality of traces comprises a first sub-line formed by the first conductive layer and a second sub-line formed by the second conductive layer.

10. The method of claim 8, wherein providing a substrate comprises providing a transparent substrate; forming the first conductive layer on the substrate comprises forming a transparent conductive layer on the substrate; forming the second conductive layer on the first conductive layer comprises forming a non-transparent conductive layer on the first conductive layer.

11. The method of claim 10, wherein forming the insulating layer on the substrate comprises forming an insulating layer made of a negative-type photoresist material on the substrate.

12. The method of claim 11, wherein defining the plurality of through holes in the insulating layer comprises:
irradiating the substrate by light from a side of substrate away from the plurality of first electrodes; and
dipping the insulating layer into a developing solution to dissolve a portion of the insulating layer shielded by the plurality of connecting pads.

13. The method of claim 8, wherein forming the plurality of second bridge portions on the insulating layer comprises:
forming a third conductive layer on the insulating layer; and
patterning the third conductive layer to form the plurality of second bridge portions.

\* \* \* \* \*